(12) United States Patent
Gerhards et al.

(10) Patent No.: US 8,500,148 B2
(45) Date of Patent: Aug. 6, 2013

(54) DEVICE FOR REDUCING ROLL MOTION IN MOTOR VEHICLES

(75) Inventors: Thomas Gerhards, Niederzier (DE); Ralf Hintzen, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 13/186,491

(22) Filed: Jul. 20, 2011

(65) Prior Publication Data

US 2012/0018972 A1 Jan. 26, 2012

(30) Foreign Application Priority Data

Jul. 21, 2010 (DE) .......................... 10 2010 036 543

(51) Int. Cl.
*B60G 21/00* (2006.01)
(52) U.S. Cl.
USPC .............................. 280/124.103; 280/124.107
(58) Field of Classification Search
USPC ................... 280/124.103, 124.106, 124.107, 280/5.502, 5.506, 5.507, 5.508, 5.509
See application file for complete search history.

(56) References Cited

U.S. PATENT DOCUMENTS

| 2,650,108 | A | * | 8/1953 | Bruce | 280/5.503 |
| 3,397,895 | A | * | 8/1968 | Kuniskis | 280/124.107 |
| 4,484,767 | A | * | 11/1984 | Klem | 280/124.107 |
| 4,573,702 | A | * | 3/1986 | Klem | 280/5.504 |
| 7,407,173 | B2 | * | 8/2008 | Walker | 280/124.134 |
| 7,735,837 | B2 | * | 6/2010 | Barth et al. | 280/5.502 |
| 8,128,110 | B2 | * | 3/2012 | Sacli | 280/124.106 |
| 2009/0026725 | A1 | * | 1/2009 | Haeusler et al. | 280/124.135 |

* cited by examiner

*Primary Examiner* — Faye M. Fleming
(74) *Attorney, Agent, or Firm* — Joseph E. Root

(57) ABSTRACT

A device for reducing roll in motor vehicles. The device includes a first and second traction mechanism and at least a first and second deflecting and rebounding suspension part connected to different vehicle sides of a vehicle body, the first and second traction mechanisms connected at one end to the first suspension part at a first connecting point and at the other end to the second suspension part at a second connecting point. Furthermore, the first traction mechanism is guided deflectably between the first and second connecting points by a first guide means mounted on the vehicle body above the first connecting point and below the second connecting point, and the second traction mechanism is guided deflectably between the first and second connecting points by a second guide means mounted on the vehicle body below the first connecting point and above the second connecting point.

19 Claims, 1 Drawing Sheet

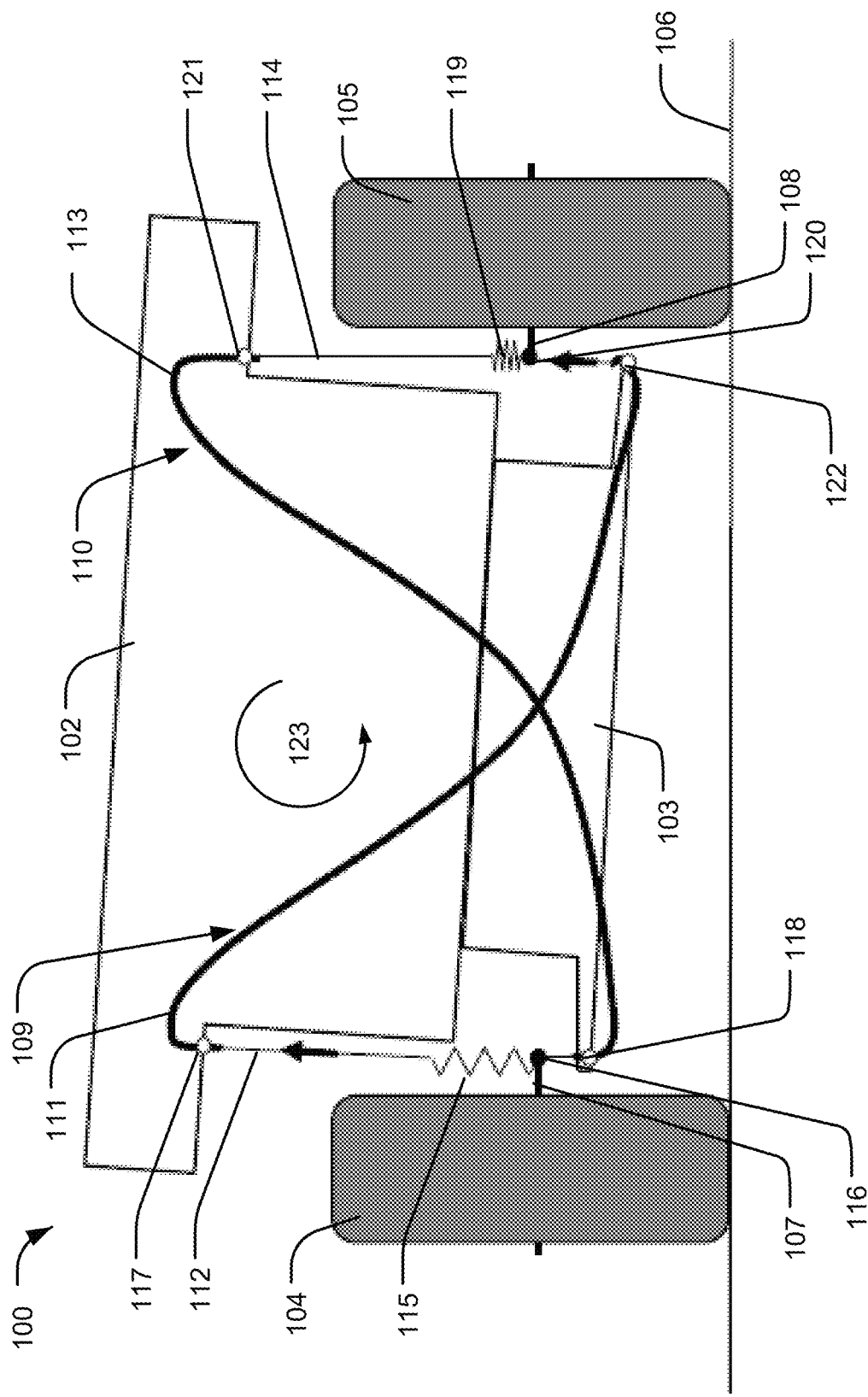

DEVICE FOR REDUCING ROLL MOTION IN MOTOR VEHICLES

TECHNICAL FIELD

The present disclosure relates to a system for reducing the roll motion in motor vehicles.

BACKGROUND

To increase the roll stiffness of motor vehicles, roll or body roll stabilizers are generally used. These stabilizers are often torsion bars with a cylindrical cross section, which connect a right-hand and a left-hand suspension of a vehicle axle to one another. Tubes can also be employed. The central part of the roll or body roll stabilizer is connected, for example, to a vehicle body and the angled ends, which act as levers, are connected via rubber elements to the respective suspension elements, such as transverse links. The terms stabilizer, roll stabilizer or body roll stabilizer used in this description refer to the same component.

In considering a pair of wheels located at the same end of a vehicle, deflection of one wheel causes spring travel to be transmitted to the second wheel by twisting the roll stabilizer, which causes the second wheel to deflect as well. Similarly, during the rebound of one wheel, spring travel is transmitted in the same way to the other wheel, which causes the second wheel to rebound correspondingly. In this way, excessive roll or body roll of the vehicle body about the vehicle's longitudinal axis during cornering, is counteracted. During simultaneous deflection and rebound of both wheels, the stabilizer behaves neutrally.

The position of the roll stabilizer is determined substantially by components in the region of the vehicle floor, the drive train, the exhaust system, the engine/transmission unit, and the chassis parts. The actual arrangement of the stabilizer is therefore often a compromise between an optimum arrangement and an arrangement largely dictated by the geometric boundary conditions of the surrounding components.

For front-wheel-drive vehicles in particular, the installation space available for the suspension components is very greatly restricted because the engine and the transmission take up most of the available installation space. Furthermore, as the stabilizers are generally considered relatively late in the development process, the design of the stabilizers and the available installation space for mounting them are often subjected to tight constraints, which results in complicated designs and considerable compromises with regard to their kinematic behavior.

One possible solution, described in patent DE10253762A1 discloses a suspension system with roll compensation in which the deflecting and rebounding suspension elements of a vehicle axle are connected to one another by means of transmission elements via a device. The solution further proposes that a cable be looped in a figure-eight around two grooved-profile pulleys, wherein the grooved-profile pulleys are arranged concentrically with respect to a body-side pivot bearing of a link. The cable is fastened to the respective grooved-profile pulleys by means of a clamping device. Furthermore, the two arms of the cable are supported on spring elements. During reciprocal deflection and rebound of the wheels, the pivoting movement of respective links causes a rotational movement at the respective body-side pivot bearings and therefore at the grooved-profile pulleys associated with the bearings. This rotational movement is converted by means of the cable into a translatory movement, which is then transmitted onward via the spring elements as a rotational movement to the other grooved-profile pulley. During joint deflection of the wheels, the suspension of the vehicle is not impaired by the described device.

Another solution described in patent DE10253762A1 presents two Bowden cables, coupled to one another in series with a spring element and/or a damping element between the cables.

SUMMARY

The present disclosure describes a device for reducing the roll motion in motor vehicles having a significantly reduced spatial requirement and a low weight in relation to roll stabilizers according to the prior art. The device permits simple assembly and substantially free guidance, and consequently offers a high degree of design flexibility, because of which a significant cost advantage can be obtained.

According to some embodiments, the device includes a first and a second traction mechanism and at least one first and one second deflecting and rebounding suspension parts connected to different sides (left and right) of a vehicle body. The first and second traction mechanisms are connected at one end to the first suspension part at a first connecting point and at the other end to the second suspension part at a second connecting point. Further, the first traction mechanism is guided deflectably between the first and second connecting points by means of at least one first guide means mounted on the vehicle body above the first connecting point and below the second connecting point. The second traction mechanism may be guided deflectably between the first and second connecting points by means of at least one second guide means mounted on the vehicle body below the first connecting point and above the second connecting point.

The device will be explained in more detail below based on an example of a vehicle axle. The exemplary vehicle axle has a first wheel on a first side (left-side) of the vehicle and a second wheel on the second side (right-side). The device is self-evidently not restricted to the number of wheels connected to the vehicle axle, such that it is also possible for more than two wheels to be provided per vehicle axle. In the remainder of the disclosure, the first side is referred to as the left side of the vehicle and the second side is referred to as the right side of the vehicle viewed in the direction of travel.

The left-side wheel is rotatably connected via a left-side wheel carrier, which is a left-side suspension part, to at least one further left-side suspension part, for example a transverse link. The left-side suspension parts are pivotably connected at the vehicle side to a vehicle body by means of an elastic pivot bearing of the transverse link. Furthermore, the stated left-side suspension parts are supported against the vehicle body, such that they can deflect and rebound, via further left-side suspension parts such as a damper element (for example, a shock absorber), and a spring element (for example, a helical spring). In general, all the movable chassis parts that connect the wheel to a vehicle body such that it may deflect and rebound are suspension parts, which can deflect and rebound within the scope of the present disclosure.

The left-side wheel and suspension parts, as a result of a force acting on the wheel perpendicular to a roadway plane, perform a deflecting and rebounding movement (i.e., a movement directed substantially perpendicular to the roadway plane). The wheel and the suspension parts are consequently vehicle components, which are movable relative to the vehicle body, whereas the vehicle body constitutes a stationary vehicle component. This selection of the reference system applies to all the following considerations and explanations of the present disclosure.

The right-hand vehicle side has substantially the same design as the left side described previously. A description of the corresponding right-side vehicle components, specifically the right-side wheel and the right-side suspension parts such as the wheel carrier, transverse link, damper, and spring element, and the arrangement and functional relationship of these parts to one another, is therefore omitted at this point of the description.

In general, a motor vehicle performs a rolling movement during cornering, wherein an outwardly directed centrifugal force acts on the vehicle body perpendicular to the direction of travel and perpendicular to the roadway plane. Due to this outward force, the vehicle rolls about the vehicle longitudinal axis because the wheel at the outside of the curve is subjected to load and deflects, whereas the wheel at the inside of the curve is relieved of load, and rebounds.

According to embodiments of the present disclosure, a first traction mechanism is provided, one end of which is connected to the left-side suspension part at a left-side connecting point. With the other end, the first traction mechanism is connected to the right-side suspension part, at a right-side connecting point. Between the left-side and right-side connecting points, the first traction mechanism is deflectably guided by a first guide means mounted on the vehicle body above the left-side connecting point and below the right-side connecting point. In other words, the first guide means, by correspondingly mounting on the vehicle body, deflects the first traction mechanism guiding it above the left-side connecting point on one vehicle side and below the right-side connecting point on the other vehicle side.

If the right-side wheel deflects during a left-hand cornering maneuver, the first traction mechanism is pulled upward by the right-side suspension part because of the deflecting movement of the wheel relative to the vehicle body. This upward movement is possible because the first traction mechanism is guided below the right-side connecting point by the first guide means mounted on the vehicle body. It will be understood that the in relation to both the suspension parts, the vehicle body constitutes a stationary vehicle component as defined in the reference system previously.

The tensile force or pulling movement of the first traction mechanism is consequently transmitted to the left-side of the vehicle with the aid of the first guide means. In particular, the first traction mechanism is guided above the left-side connecting point by the first guide means, such that the first traction mechanism pulls the left-side suspension part upward. Therefore, the left-side suspension part and the wheel connected thereto follow the spring movement of the right-side suspension part, and likewise deflect. The spring elements, for example helical springs, which support the left-side and right-side suspension parts against the vehicle body accordingly jointly counteract the body roll, which would not be the case without the first traction mechanism. If the first traction mechanism were not present, only the right-side suspension parts would act against the spring elements supporting the vehicle body, and the spring elements would counteract the body roll.

According to embodiments of the present disclosure, during a rolling movement in the opposite direction (right-hand curve), the second traction mechanism comes into effect. This mechanism, similarly to the first traction mechanism, is connected with one end to the left-side suspension part at the left-side connecting point, and with the other end to the right-side suspension part at the right-side connecting point. In contrast to the first traction mechanism, however, the second traction mechanism is deflectably guided by at least one second guide means mounted on the vehicle body below the left-side connecting point and above the right-side connecting point.

If the left-side wheel deflects as the vehicle travels around a right-hand curve, the second traction mechanism is pulled upward by the left-side suspension part, because of the deflecting movement of the wheel relative to the vehicle body. The deflecting movement is caused as the second traction mechanism is guided below the left-side connecting point by means of the second guide means mounted on the vehicle body. As already explained, the vehicle body is a stationary vehicle component in relation to the suspension parts.

The tensile force or pulling movement of the second traction mechanism is consequently transmitted to the right-hand vehicle side with the aid of the second guide means. In particular, the second traction mechanism is guided above the right-side connecting point by the second guide means mounted on the vehicle body, such that the second traction mechanism pulls the right-side suspension part upward. Therefore, the second suspension part and the wheel connected thereto follow the spring movement of the left-side suspension part, and likewise deflect. In this case too, the spring elements, for example helical springs, which support the left-side and right-side suspension parts against the vehicle body, jointly counteract the body roll, which would not be the case without the second traction mechanism. Without this mechanism, only the left-side suspension parts would act against the spring elements supporting the vehicle body, and only the spring elements would counteract the body roll.

The first traction mechanism is consequently arranged mirror-symmetrically with respect to the second traction mechanism.

During joint deflection with the same spring travel of both the left-side and the right-side suspension part, the first and second traction mechanisms do not substantially influence the suspension parts with regard to the spring travel. In this case, the first and second traction mechanisms behave neutrally.

The device according to the present disclosure requires minimum mounting space. For example, by using traction mechanisms, which transmit forces only in the profile direction, the device size may be considerably smaller than conventional roll stabilizers. Furthermore, the traction mechanisms and the corresponding guide means are lightweight. Moreover, the fraction mechanisms, being flexible, can be assembled easily in or on the motor vehicle and it may be mounted in multiple possible guide mean arrangements on the vehicle body. The device, therefore, offers more space for new configuration options for other vehicle components. In consequence to these features, a considerable cost advantage may be obtained with the device according to the present disclosure.

The first and second traction mechanisms may be two mutually separate traction mechanisms. These mechanisms are in particular fully independent of one another with regard to their mode of operation and action. As has already been described in detail above, the body roll in one direction leads merely to a transmission of force via one of the two traction mechanisms. The other traction mechanism is not influenced by the rolling movement in one direction, at least not in the sense of an active transmission of force. The independence of the fraction mechanisms permits a particularly flexible configuration for laying paths of the traction mechanisms.

According to one embodiment, the first and second traction mechanisms may be of different lengths. In this way, the traction mechanisms may be guided over completely different mounting paths, in particular mounting paths of different lengths, to the corresponding left and right wheel-suspension-side connecting points. Different mounting paths significantly increase both the flexibility in the configuration and mounting of the traction mechanisms.

In another embodiment, at least one spring element is arranged between the first or second traction mechanism and the left or right suspension part respectively or the vehicle body. The spring element advantageously allows the roll rate to be adjusted. Without such a spring element, the spring movement of a suspension part is transmitted rigidly to the suspension part of the opposite vehicle side. The spring element may for example be a pneumatic, hydro-pneumatic, or steel spring.

In yet another embodiment, the spring element may be arranged between the end of the first fraction mechanism and the left-side connecting point of the left-side suspension part. Further, another spring element may be arranged between the end of the second traction mechanism and the right-side connecting point of the right-side suspension part. The spring elements may, however, be arranged between the end of the first traction mechanism and the right-side connecting point of the right-side suspension part and between the end of the second traction mechanism and the left-side connecting point of the left-side suspension part. The latter two spring elements may self-evidently also be arranged together with the former two spring elements at the stated locations, such that two spring elements are provided per traction mechanism. In some configuration, the same number of spring elements may be provided per traction mechanism to ensure a uniform, symmetrical force of action or transmission of force of the two traction mechanisms. This symmetrical force leads to stable and uniform body roll control with regard to the roll movement to both vehicle sides.

It would likewise be conceivable for the left and right guide elements of the respective first and second traction mechanisms or the mounting arrangement thereof on the vehicle body to be provided with a correspondingly suitable spring characteristic. The task of the previously described spring elements could consequently be performed entirely by the left and right guide elements. Alternatively, the guide elements may perform the task in juxtaposition with the spring elements.

The spring characteristic or strength of the spring elements may be adjustable. Moreover, the spring elements may be manually adjustable by a vehicle technician or possibly also by a driver, or the characteristics of the elements may also be automatically adjustable by a vehicle control unit.

In a further embodiment, at least one damping element is arranged between the first and second fraction mechanisms and the left or right suspension part, respectively, or the vehicle body. The structure and arrangement of the damping elements is similar to the spring element, and therefore, they are not described here again. The damping element(s) prevent(s) the transmission of vibrations between the suspension parts connected by means of the traction mechanism. Stable roll or body roll control is therefore ensured by means of the device according to the present disclosure.

In a further embodiment, the vehicle body comprises a subframe. The traction mechanisms arranged below the respective connecting points of the corresponding suspension parts are guided on the subframe with the aid of the respective guide means. In this way, an arrangement or alignment of the traction mechanisms in relation to the arrangement or position of the respective wheel-suspension-side connecting points is possible in order to permit an optimum transmission of force to the respective traction mechanisms during the deflection of the suspension parts.

One arrangement for the transmission of force may be obtained if the traction mechanism is guided, with the aid of the guide means mounted on the subframe, below the connecting point in such a way that it lies as close as possible to or on the movement vector of the connecting point of the corresponding suspension parts. The movement vector is predefined by the deflection travel of the connecting point.

In a further embodiment of the present disclosure, the traction mechanisms may be cables, and at least two first and second guide means may be provided. Cables such as conventional steel cables may be utilized, as they require a minimal installation space for mounting. In this embodiment, the guide means are preferably deflecting bearings such as deflecting pins or deflecting rollers, which are suitable for deflecting the cable and mounting on the vehicle body. For the deflection of the first cable, at least two deflecting bearings are provided, such that the cable is deflected above the left-side connecting point on the left-side deflecting bearing mounted on the vehicle body and below the right-side connecting point on the right-side deflecting bearing mounted on the vehicle body. Here, the positions of the deflecting bearings may be selected arbitrarily as long as deflectable, correct guidance of the cable is ensured. The number of deflecting bearings may likewise be more than two, and is dependent substantially on the selected mounting path of the cable. The second cable is preferably assigned at least two deflecting bearings. The statements made here with regard to the first cable apply analogously to the second cable.

In a further embodiment, the traction mechanisms may be the cores of Bowden cables, and the guide means may be the sheaths of the Bowden cables, in which the corresponding cores are deflectably guided.

As known, a Bowden cable is a movable machine element for transmitting a mechanical movement or a force by means of a combination of a core such as a wire cable and a sheath, which is stable in the profile direction and in which the core is guided. In this embodiment, it may be possible to use conventional Bowden cables such as handbrake cables in motor vehicles. The use of conventional Bowden cables offers a large cost advantage because such Bowden cables are commercially available as low-cost bulk commodities. Furthermore, no further deflecting rollers are required, which may be required when using a cable, because the sheath of the Bowden cable serves to deflectably guide the core.

The sheath of the first Bowden cable may be mounted at one end above the left-side connecting point on the vehicle body and at the other end below the right-side connecting point to the vehicle body. The sheath of the second Bowden cable may be mounted at one end below the left-side connecting point to the vehicle body and at the other end above the right-side connecting point to the vehicle body. Further, bearing points on the vehicle body may not be required, but may self-evidently be provided depending on the guidance and the mounting path of the Bowden cables.

The Bowden cables also require a significantly smaller installation space, and have a considerably lower weight, while providing the same function as a body roll stabilizer. Furthermore, the Bowden cables can be assembled and laid significantly more easily, in particular on account of the particularly advantageous combination of core and sheath, wherein the core serves to transmit the spring travel of the deflecting and rebounding suspension part, while the sheath provides the deflectable guidance of the core. The use of Bowden cables as a combination of traction mechanism and guide means therefore offers the same advantages described previously.

In a further embodiment, the first and second Bowden cables may be designed to transmit only tensile forces acting on the corresponding cores. Because the cables do not transmit compressive forces, buckling-resistant rods are not required at the ends of the Bowden cables. The Bowden cables designed for transmitting only tensile forces permit the use of particularly cost-effective standard Bowden cables.

The arrangement or position of the left-side and right-side connecting points relative to the respective suspension parts and the arrangement or position of the traction mechanisms, which are guided above and below the connecting points by the guide means mounted on the vehicle body, relative to the position of the connecting points, influences the transmission ratio with which the spring movement of one suspension part is transmitted to the other suspension part on the opposite side of the vehicle. Here, a transmission ratio means the ratio of the spring travel of the deflecting and rebounding suspension part to the spring travel transmitted by means of the traction mechanism.

The suspension parts to which the Bowden cables are connected may include a link, a spring or damper part, or a wheel carrier. Any other suspension part which follows a spring movement during deflection and rebound is, however, likewise suitable. As has already been described, the transmission ratio of the spring travel transmitted via the fraction mechanism can be influenced by means of the selection of the connecting point or the position of it on a suspension part.

The positions of the connecting points and of the guide means mounted on the vehicle body side may be selected such that the spring movement of the first and second suspension parts is transmitted by means of the traction mechanism with a transmission ratio of approximately 1:1. This ratio is possible by selecting the connecting point on a wheel carrier, as the spring movement of the wheel carrier corresponds to the spring movement of the wheel correspondingly connected to the wheel carrier. It is substantially possible for the spring travel to be transmitted by means of the Bowden cables to the wheel carrier on the opposite vehicle side, as a result of which the rolling movement of the vehicle body is optimally counteracted.

It is expedient that a damping action can be generated by the first and second Bowden cable during the body roll movement, which is highly desirable, wherein the damping is generated by friction of the core against the sheath. This damping is variable and can be adjusted according to demand by providing different lubricants such as greases or oils, which influence the level of friction between the core and sheath.

Further advantageous details and effects of the present disclosure are explained in more detail below based on an exemplary embodiment illustrated in the drawing.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

FIG. 1 illustrates a schematic view of a system for reducing roll movement in a vehicle according to some embodiments of the present disclosure.

DETAILED DESCRIPTION

The following detailed description is made with reference to the figures. Exemplary embodiments are described to illustrate the subject matter of the disclosure, not to limit its scope, which is defined by the appended claims.

FIG. 1 schematically illustrates an exemplary motor vehicle 100 according to some embodiments of the present disclosure. The motor vehicle 100 is shown in a sectional view in the direction of travel, with the vehicle longitudinal axis accordingly extending into the plane of the drawing. The motor vehicle 100 comprises a vehicle body 102 and a subframe 103 arranged below the vehicle body 102 and connected to the it. The motor vehicle body 100 also comprises a first wheel 104 assigned to the left-side of the vehicle 100 and a second wheel 105 assigned to the right-side of the vehicle. The wheels stand on a roadway plane 106 and are connected to the vehicle body 102 by means of a left-side wheel carrier 107 and a right-side wheel carrier 108, respectively. In the exemplary embodiment, the left-side wheel carrier 107 corresponds to a first suspension part and the right-side wheel carrier 108 corresponds to a second suspension part.

A detailed illustration of the connection or articulated connection of the respective wheels 104 and 105 has been omitted from FIG. 1 for reasons of clarity. For clarity, it is however mentioned that the wheels are connected to the vehicle body 102 in the conventional way, by means of a transverse link (not shown) and are supported on the vehicle body 102, such that they can deflect and rebound, by means of respective spring elements, such as a helical spring, and damper elements such as a shock absorber, none of which are shown, for purposes of simplicity and clarity.

Also illustrated in FIG. 1 are a first Bowden cable 109 and a second Bowden cable 110. The first Bowden cable 109 has a sheath 111 and a core 112 guided therein. The second Bowden cable 110 has a sheath 113 and a core 114 guided therein. The core 112 of the first Bowden cable 109 therefore corresponds to a first fraction mechanism and the sheath 111 of the first Bowden cable 109 corresponds to a first guide means. Furthermore, the core 114 of the second Bowden cable 110 corresponds to a second traction mechanism and the sheath 113 of the second Bowden cable 110 corresponds to a second guide means.

The core 112 of the first Bowden cable 109 is connected at one end to one end of a left-side spring element 115. The left-side spring element 115 is connected at its other end to the left-side wheel carrier 107 at a first connecting point 116. Above the first connecting point 116, one end of the sheath 111 of the first Bowden cable 109 is mounted on the vehicle body 102 at a first body-side bearing point 117. Below the first connecting point 116, one end of the sheath 113 of the second Bowden cable 110 is mounted on the subframe 103 at a first subframe-side bearing point 118.

On the right-side of the vehicle, the core 114 of the second Bowden cable 110 is connected at one end to one end of a right-side spring element 119. The right-side spring element 119 is connected at its other end to the right-side wheel carrier 108 at a second connecting point 120. Above the second connecting point 120, one end of the sheath 113 of the second Bowden cable 110 is mounted on the vehicle body 102 at a second body-side bearing point 121. Below the second connecting point 120, one end of the sheath 111 of the first Bowden cable 109 is mounted on the subframe 103 at a second subframe-side bearing point 122.

The core 112 of the first Bowden cable 109 is therefore deflectably guided between the first connecting point 116 and the second connecting point 120 by means of the sheath 111 of the first Bowden cable 109. Likewise, the core 114 of the second Bowden cable 110 is deflectably guided between the first connecting point 116 and the second connecting point 120 by means of the sheath 113 of the second Bowden cable 110

If the motor vehicle 100 deflects on the right-side of the vehicle and in particular at the right-side wheel 105 as a result of a left-hand cornering maneuver, the motor vehicle 100 and in particular the vehicle body 102 including the subframe 103 performs a body roll or rolling movement about the vehicle longitudinal axis. In the illustrated situation in FIG. 1, the rolling movement is in the clockwise direction and it is denoted by a corresponding arrow 123.

Because of the rolling movement, the spacing increases between the second connecting point 120 of the right-side wheel carrier 108, to which the core 112 of the first Bowden cable 109 is connected, and the second subframe-side bearing point 122, on which the sheath 111 of the first Bowden cable 109 is mounted. This leads to a tensile force being exerted on the core 112 by the second connecting point 120. The core 112 is pulled upward relative to the sheath 111 on the right-hand vehicle side as indicated in FIG. 1 by corresponding arrows along the core 112. This tensile force, or the pulling movement of the core 112 caused by said force, is transmitted via the first body-side bearing point 117 to the vehicle's left side and onward via the left-side spring element 115 and the first connecting point 116 to the left-side wheel carrier 107. The left-side wheel 104 therefore, depending on the spring characteristic or the spring strength of the left-side spring element 115, follows the spring movement of the right-side wheel 105 and likewise deflects. Therefore, the body roll or rolling movement of the motor vehicle 100 is counteracted by both spring elements (not illustrated) which serve to support the wheel carriers 107 and 108 against the vehicle body 102 such that they can deflect and rebound.

If the vehicle travels around a right-hand curve, i.e., counter to the direction indicated by the arrow 123, the action of the second Bowden cable 110, results in the tensile force or pulling movement being transmitted from the deflecting left-side wheel 104 via the second Bowden cable 110 to the right-side wheel 105. This takes place analogously to the situation described above, in which the rolling movement was in the clockwise direction.

During a joint deflection both of the left-side wheel 104 and of the right-side wheel 105, the first and second Bowden cables 109 and 110 do not influence the spring movement of the wheels 104 and 105 during deflection and rebound.

The first and second Bowden cables 109 and 110 transmit tensile forces acting on the respective cores 112 and 114, but not compressive forces. Therefore, buckling-resistant rods or sleeves for guiding the respective cores 112 and 114 may not be required between the first and second body-side bearing points 117 and 121 and the first and second connecting points 116 and 120, and between the first and second subframe-side bearing points 118 and 122 and the first and second connecting points 116 and 120.

The spring elements 115 and 119 serve to set a desired body roll or roll rate. The arrangement of the spring elements 115 and 119 shown in FIG. 1 is merely exemplary and does not limit the scope of the present disclosure. Other spring element arrangements are also possible.

Moreover, the Bowden cables 109 and 110 are independent of one another. In particular, their mode of operation or action does not influence one another. The Bowden cables may therefore for example also be mounted independently of one another in or on the motor vehicle 100 or the vehicle body 102. In particular, the Bowden cables may be of different lengths, because of which the Bowden cables 109 and 110 may be mounted over completely different mounting paths in and on the motor vehicle 100 or vehicle body 102. The system therefore increases the flexibility in the configuration of the mounting paths of the Bowden cables 109 and 110 and opens up new configuration options for other vehicle components as the Bowden cables take significantly less space.

In one embodiment, the system for reducing the rolling motion is arranged on at least one vehicle axle of a motor vehicle and has two Bowden cables as traction mechanisms and guide means for transmitting the spring travel from deflecting and rebounding suspension parts on one vehicle side to an opposite vehicle side. Here, the vehicle axle may be a driven axle or a non-driven axle, in particular for example rigid axle, torsion beam axle or individual suspension, longitudinal link axle or semi-trailing link axle.

The terminology used herein describes particular embodiments only and it is not intended to be limiting of the disclosure. It will be appreciated that several of the disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

We claim:

1. A device for reducing roll motion in a motor vehicle body, comprising:
    a first traction mechanism including a first Bowden cable having first core;
    a second traction mechanism including a second Bowden cable having second core;
    at least one first and at least one second deflecting and rebounding suspension part articulately connected to different vehicle sides of the vehicle body; and
    first and second connecting points connecting the first and second traction mechanisms at one end to the first suspension part and at the other end to the second suspension part;
    a first guide means, mounted on the vehicle body above the first connecting point and below the second connecting point, for deflectably guiding the first traction mechanism between the first and second connecting points; and
    a second guide means, mounted on the vehicle body below the first connecting point and above the second connecting point, for deflectably guiding the second traction mechanism between the first and second connecting points.

2. The device of claim 1, wherein the first and second traction mechanisms are independent of one another.

3. The device of claim 1, wherein the first and second traction mechanisms are of different lengths.

4. The device of claim 1, wherein at least one spring element is arranged between the first or second traction mechanism and the first or second suspension part respectively or the vehicle body.

5. The device of claim 4, wherein the spring elements is at least one of a pneumatic spring, hydro-pneumatic spring, or a steel spring.

6. The device of claim 1, wherein at least one damping element is arranged between the first or second fraction mechanism and the first or second suspension part respectively or the vehicle body.

7. The device of claim 1, wherein the first and section traction mechanisms are a first and a second cable respectively, and at least two first and at least two second guide means are provided.

8. The device of claim 1, wherein the first and second guide means comprising a first and second sheath respectively, in which the corresponding first and second core respectively is deflectably guided.

9. The device of claim 1, wherein the first and second Bowden cables are designed to transmit only tensile forces acting on the respective cores.

10. The device of claim 1, wherein the first and second suspension parts are at least one of a link, a spring part, a damper part, or a wheel carrier.

11. The device of claim 1 further comprising a subframe.

12. The device of claim 11, wherein the first and second guide means are mounted on the subframe.

13. The device of claim 1 incorporated in at least one vehicle axle of a motor vehicle.

14. A system for reducing roll motion in a motor vehicle, the vehicle having a vehicle body and a subframe, the system comprising:
   first and second vehicle sides;
   first and second wheels connected to the first and second vehicle sides respectively;
   first and second suspension elements connected to the first and second wheels respectively;
   first and second connecting points proximate to the suspension elements at the first and second vehicle sides, respectively;
   first and second body bearing points situated on the vehicle body at the first and second vehicle sides respectively;
   first and second frame bearing points situated on the subframe at the first and second vehicle sides respectively, the frame bearing points situated below the body bearing points and the connecting points;
   a first Bowden cable including:
      a first core extending between the first connecting point and the first body bearing point; and
      a first sheath extending between the first body bearing point and the second frame bearing point;
   a second Bowden cable including:
      a second core extending between the second connecting point and the second body bearing point; and
      a second sheath extending between the second body bearing point and the first frame bearing point.

15. The system of claim 14, wherein the first and second Bowden cables are independent of one another.

16. The system of claim 14, wherein the first and second Bowden cables are of different lengths.

17. The system of claim 14, wherein the first or second cores are deflectably guided between the first connecting point and the second connecting point by means of the first or second sheaths.

18. The system of claim 14, wherein at least one spring element is arranged between the first or second cores and the first or second suspension elements respectively or the vehicle body.

19. The system of claim 18, wherein the spring element is at least one of a pneumatic spring, hydro-pneumatic spring, or a steel spring.

* * * * *